(12) United States Patent
Dardikman et al.

(10) Patent No.: US 8,638,475 B2
(45) Date of Patent: Jan. 28, 2014

(54) RECREATING STEP AND REPEAT GEOMETRICAL DATA

(75) Inventors: Shay Dardikman, Tel-Aviv (IL); Yoav Telem, Kfar-Schmaryahu (IL)

(73) Assignee: Eastman Kodak Company, Rochester, NY (US)

( * ) Notice: Subject to any disclaimer, the term of this patent is extended or adjusted under 35 U.S.C. 154(b) by 199 days.

(21) Appl. No.: 12/948,044

(22) Filed: Nov. 17, 2010

(65) Prior Publication Data

US 2012/0121186 A1    May 17, 2012

(51) Int. Cl.
*H04N 1/405* (2006.01)
(52) U.S. Cl.
USPC .......... 358/3.08; 382/199; 382/195; 358/534; 358/536
(58) Field of Classification Search
USPC ........................................................ 358/3.08
See application file for complete search history.

(56) References Cited

U.S. PATENT DOCUMENTS

| 5,384,648 A * | 1/1995 | Seidner et al. ................ 358/534 |
| 2010/0220364 A1 * | 9/2010 | Picard et al. ................. 358/3.28 |

* cited by examiner

*Primary Examiner* — Twyler Haskins
*Assistant Examiner* — Christopher D Wait
(74) *Attorney, Agent, or Firm* — Nelson Adrian Blish

(57) ABSTRACT

A method for extracting step and repeat data from a halftone printing job (200). De-screening a halftone image data on a computer (104) to create a de-screened image. The de-screening (512) is performed on a halftone image data stored in a computer storage (116). The halftone image data contains at least one step and repeat element (208). The de-screened image is scanned (516) to identify unique pixel segments (520). All instances of the found unique pixel segments are used to reconstruct (524) the step and repeat data previously used to create the halftone printing job (200).

6 Claims, 6 Drawing Sheets

RECREATING STEP AND REPEAT GEOMETRICAL DATA

CROSS REFERENCE TO RELATED APPLICATIONS

Reference is made to commonly-assigned U.S. patent application Ser. No. 12/025,807 (now U.S. Publication No. 2009/0195837), filed Feb. 5, 2008, entitled A METHOD FOR IMAGING FLEXOGRAPHIC PLATES, by Dardikam et al., the disclosure of which is incorporated herein.

FIELD OF THE INVENTION

The present invention relates to flexography printing and more specifically to methods and apparatus for retrieving step and repeat geometry data from a ready to expose print job.

BACKGROUND OF THE INVENTION

Flexographic plate preparation process is relatively expensive compared to other types of plate preparation such as those used in offset printing. At the end of the plate preparation process a flexographic print job 200 as is shown in FIG. 2 is ready for imaging on a flexographic plate. The flexographic print job contains screened data 204 (data which is ready for exposure), the print job is typically presented by a one bit tagged image file format (TIFF) and contains at least one step and repeat element. The step and repeat element is repeated on the surface of the print job according to a specific geometry required for accomplishing the print job. The print job, when created, is adjusted to a specific plate imaging device, to conform to the imaging size characteristics of a specific imaging device.

There are circumstances when a ready to expose version of the job (or digital plate) is present without the geometrical information of the step and repeat element positioning on the plate, and a rerun of the job is required on an imaging device with different characteristics than the device for which the job had been originally prepared. The current practice is for an expert to manually inspect the printing job. The expert will identify the step and repeat element 208 on the printing job 200 and measure its bounding box. In addition, he will measure the geometrical repeat scheme used in the original job. Those measurements will be used to recreate the imposition scheme of the printing job.

There are also circumstances when a change needs to be applied to each one of the step and repeat elements, for example removing part of the screened data or adding data to each element. Current practice would be to apply the edit to each one of the elements separately, which would be time consuming.

SUMMARY OF THE INVENTION

Briefly, according to one aspect of the present invention a method for extracting step and repeat data from a halftone printing job representation includes retrieving halftone image data from a computer storage element wherein the halftone image data contains at least one step and repeat element; descreening on the halftone image data on a computer to create a descreened image; scanning the descreened image to identify unique pixel segments; finding all instances of the unique pixel segments on the descreened image; marking geometrical information of the instances; and retrieving the step and repeat data according to the geometrical information.

The invention and its objects and advantages will become more apparent in the detailed description of the preferred embodiment presented below.

DETAILED DESCRIPTION OF THE INVENTION

Figure 1:
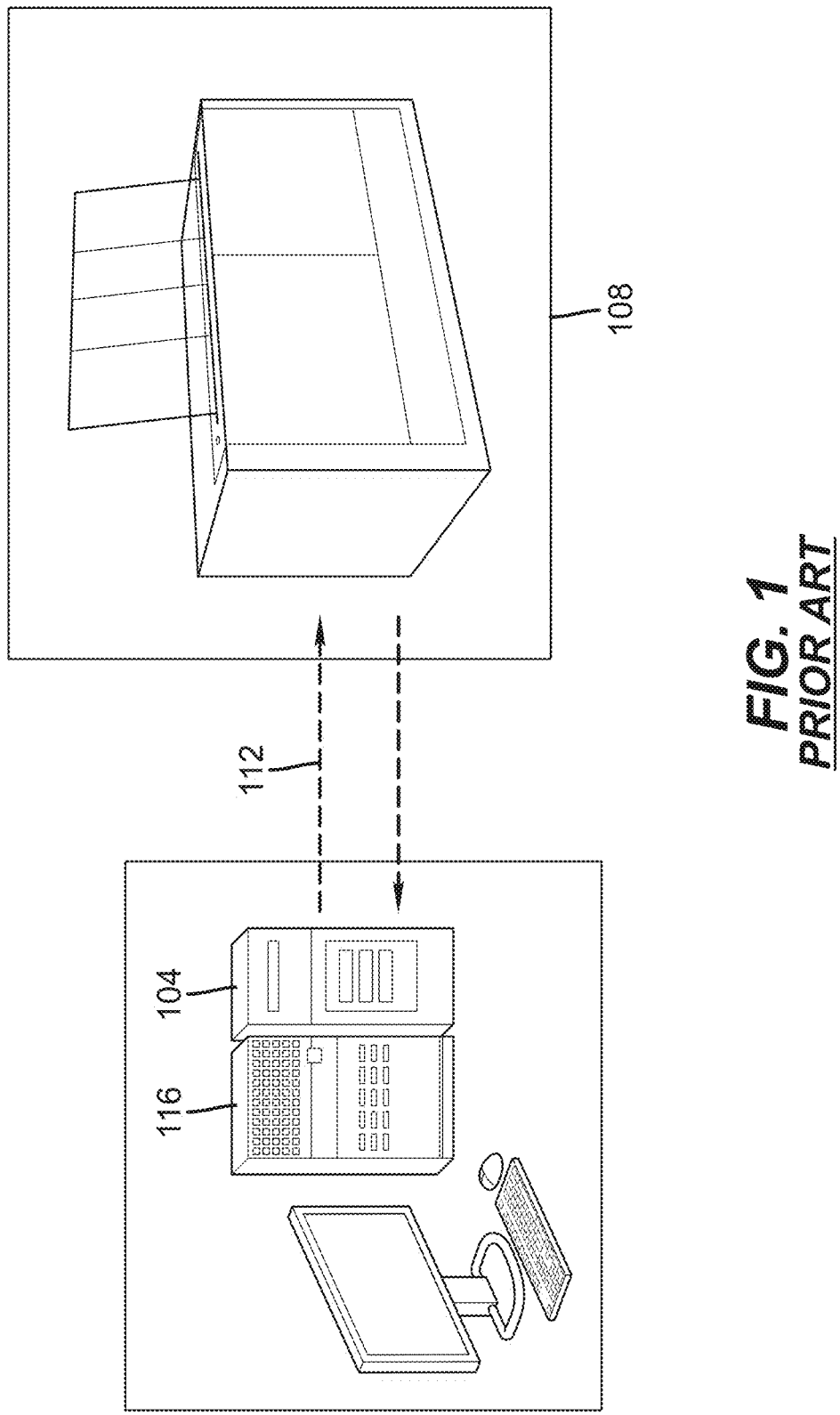
FIG. 1 is an illustration of a prior art digital front end (DFE) driving an imaging device.
Figure 2:
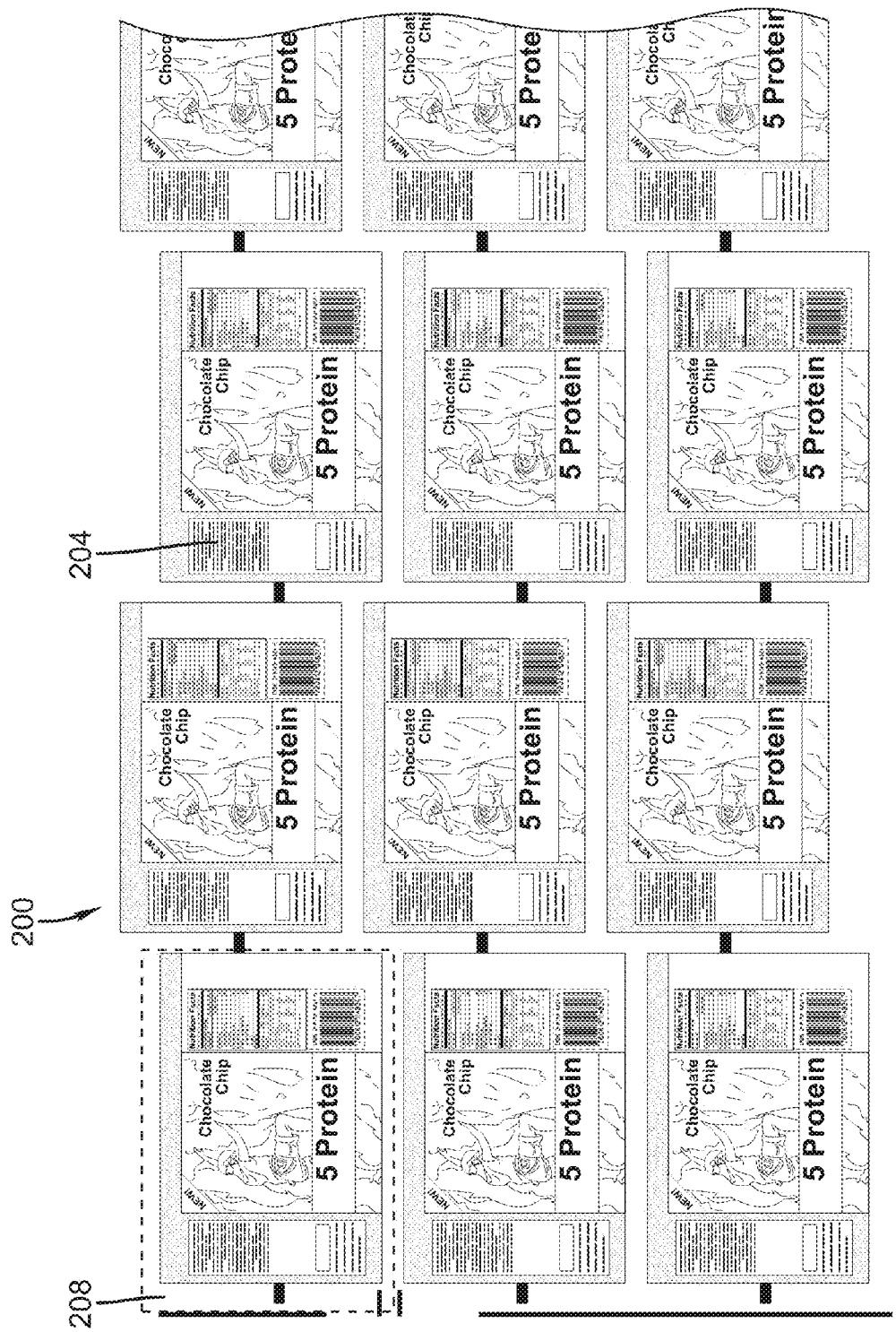
FIG. 2 is an illustration of a prior art step and repeat element imposed on layout prepared for a one-up artwork for imaging.

The present invention describes techniques to for recreating geometrical information out of a previously rendered printing job 200. The printing job is provided to a digital front end 104 (DFE) shown in FIG. 1 for processing. The DFE 104 is connected to computer storage 116 adapted to store printing job 200, intermediate and processed information. The DFE 104 also drives imaging device 108, via interface line 112. The printing job 200 will first undergo a de-screening treatment wherein the screened data 204 is simulated from halftone information to gray level data. The transformation of the printing job 200 back into gray level data helps to achieve accurate analysis on the printing job 200.

Figure 3:
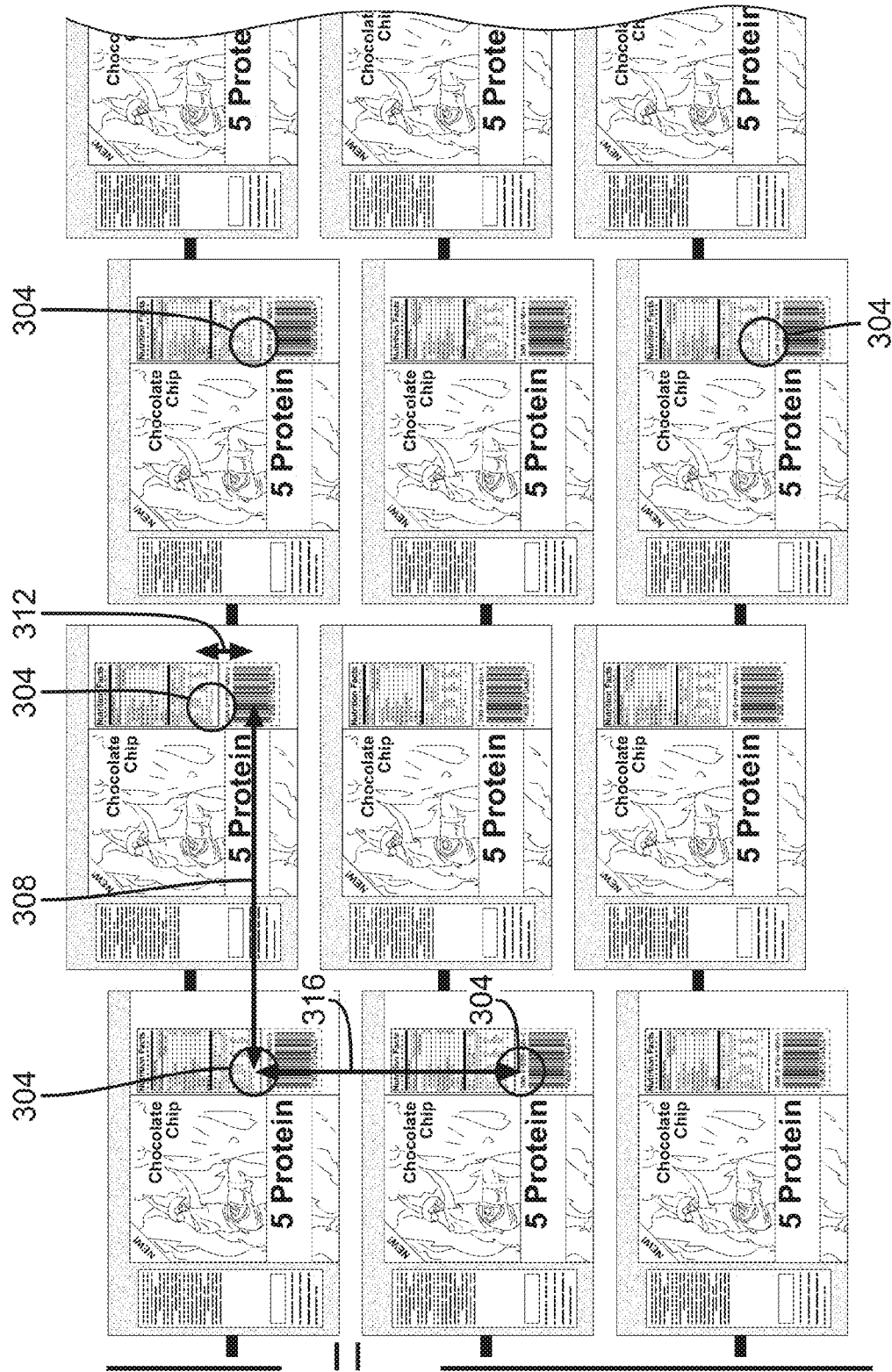
FIG. 3 is a schematic illustration of identified unique pixel areas on the layout sheet.

The next step searches for unique pixel area 304 (shown in FIG. 3). The uniqueness of the area is defined by the spread of pixel values in the gray level calculated in the previous step, the more the values in the area differ from one another the more unique the area is. The unique pixel area 304 is found in every one of repeats of the step and repeat element 208 on the surface of printing job 200. The entire gray level is searched for areas that will match the unique area found in the previous step. Since the de-screening process cannot recreate the exact original gray scale, a match is determined using a more complex method that allows some pixel value differences. After identifying all instances of the unique pixel areas 304 the step length in X direction 308 and the step length in Y direction 316 are calculated by calculating the distances between two consecutive step and repeat elements 208 in the X and Y directions respectively. In addition the length of stagger 312 is derived from the previously identified data.

Figure 4:
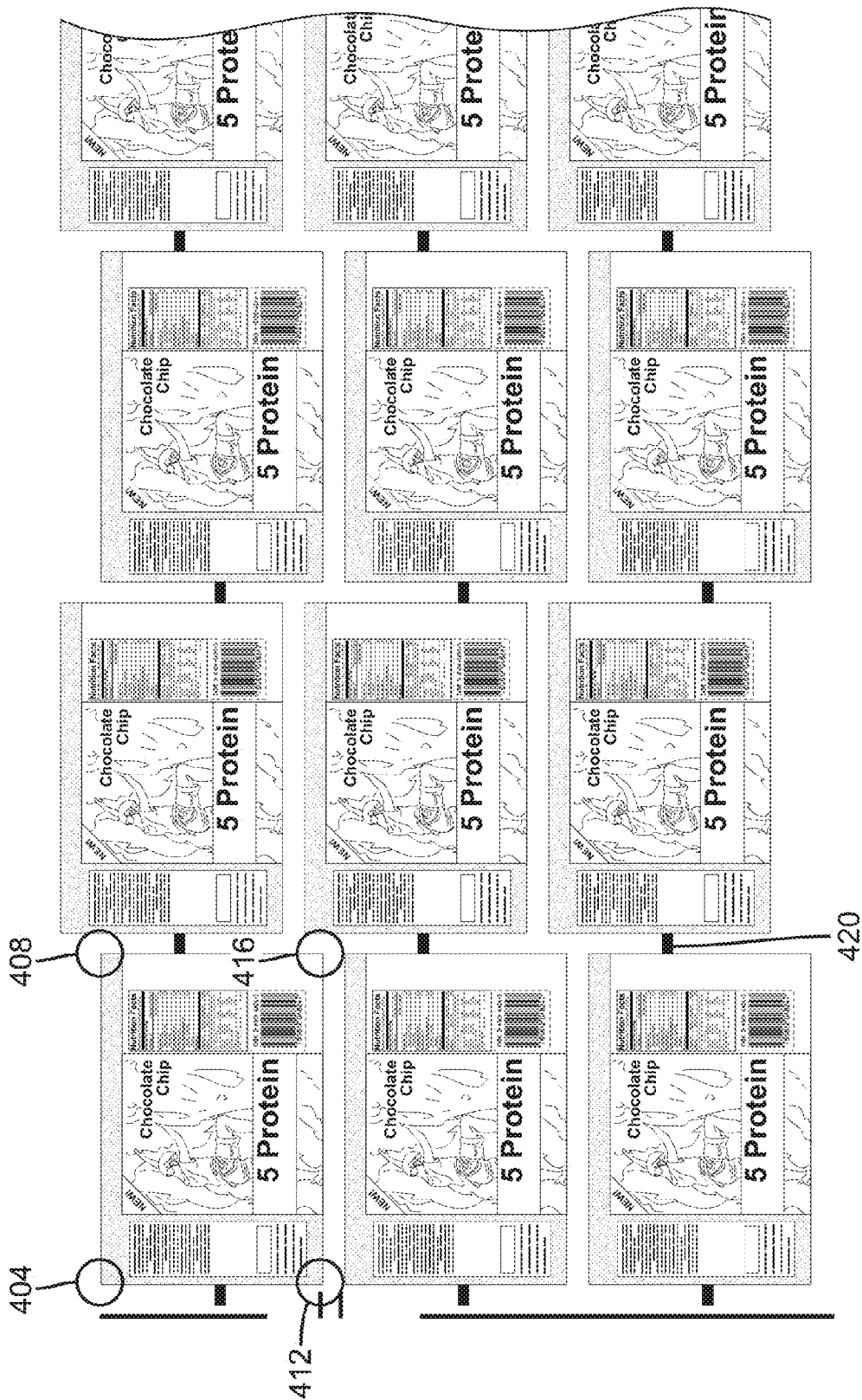
FIG. 4 is a schematic illustration showing an identified bounding box of a step and repeat element.

FIG. 4 shows in additional step required for identifying the bounding box of the step and repeat element 208. The printing job 200 (after de-screening) is inspected. The start of the data in step and repeat element 208 is found for top left corner 404, top right 408, bottom left 412, and bottom right 416. This is done by identifying the edges of the step and repeat, which are the last areas in the step and repeat that can be found also in the other step and repeat elements. A similar matching method is used here, is order to determine if the suspected edge area can be found in other step and repeat elements. This data is required for identifying the bounding box of the step and repeat element 208. In addition gap size 420 is calculated from the identified bounding box data (404, 408, 412, 416) and the previously identified step length in X direction 308 and step length in Y direction 316.

The information retrieved above provides the full geometrical information of the printing job 200.

Figure 5:
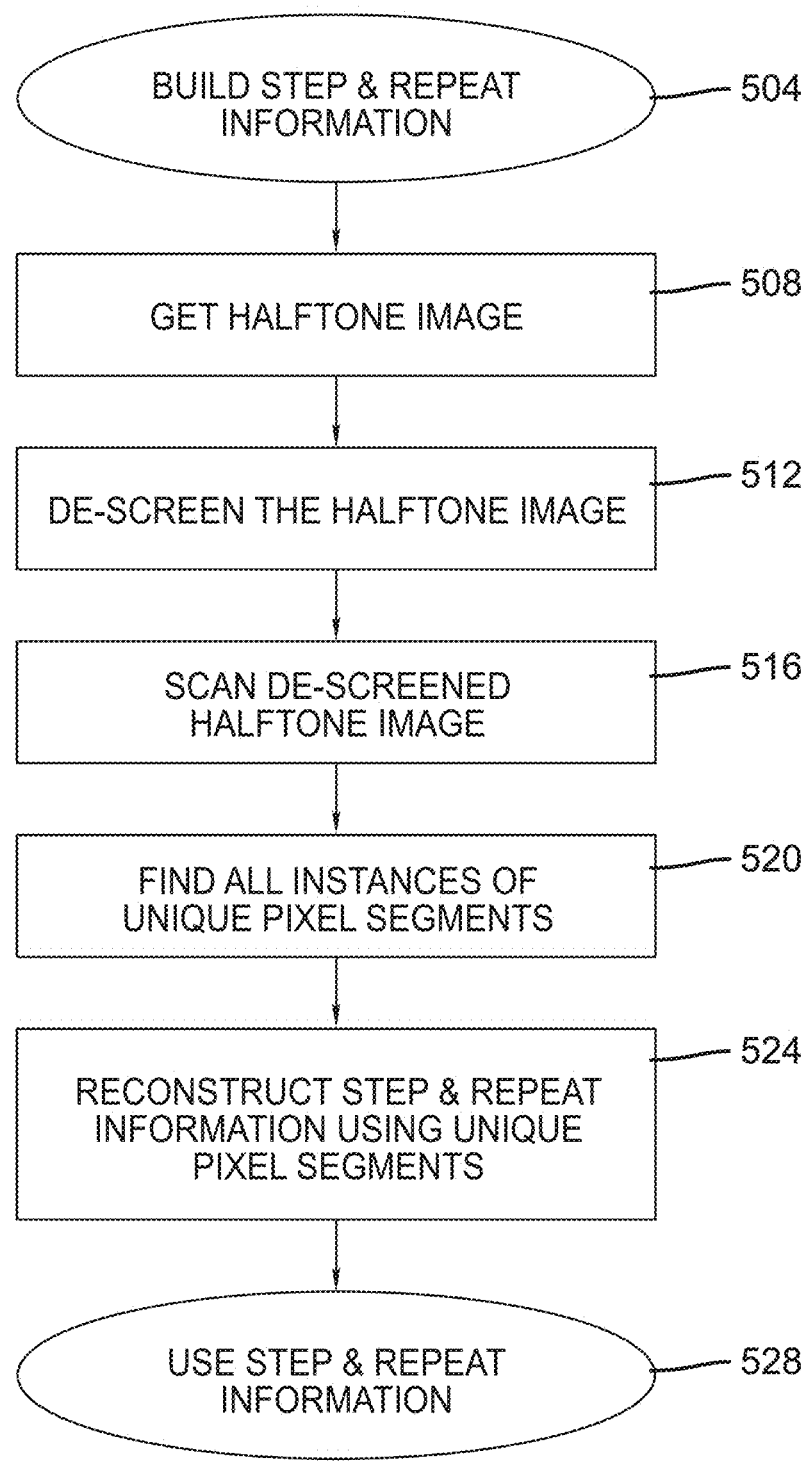
FIG. 5 is a flowchart representing an embodiment of the invention.

FIG. 5 shows a flowchart, summarizing the present invention. The method reconstructs the step and repeat information 504. The first step is to receive 508 the halftone printing job 200, followed by a de-screening step 512 of job 200 performed by DFE 104. The reason for the de-screening step, is to facilitate the analysis on printing job 200, which is very limited when is done on halftone image. In step 520 the de-screened halftone image is scanned. The next step 516, is to find all instances in job 200 (after de-screening) with unique pixel data segments. The found unique pixel segments are later provided to step 524, in order to reconstruct step and repeat information.

Figure 6:
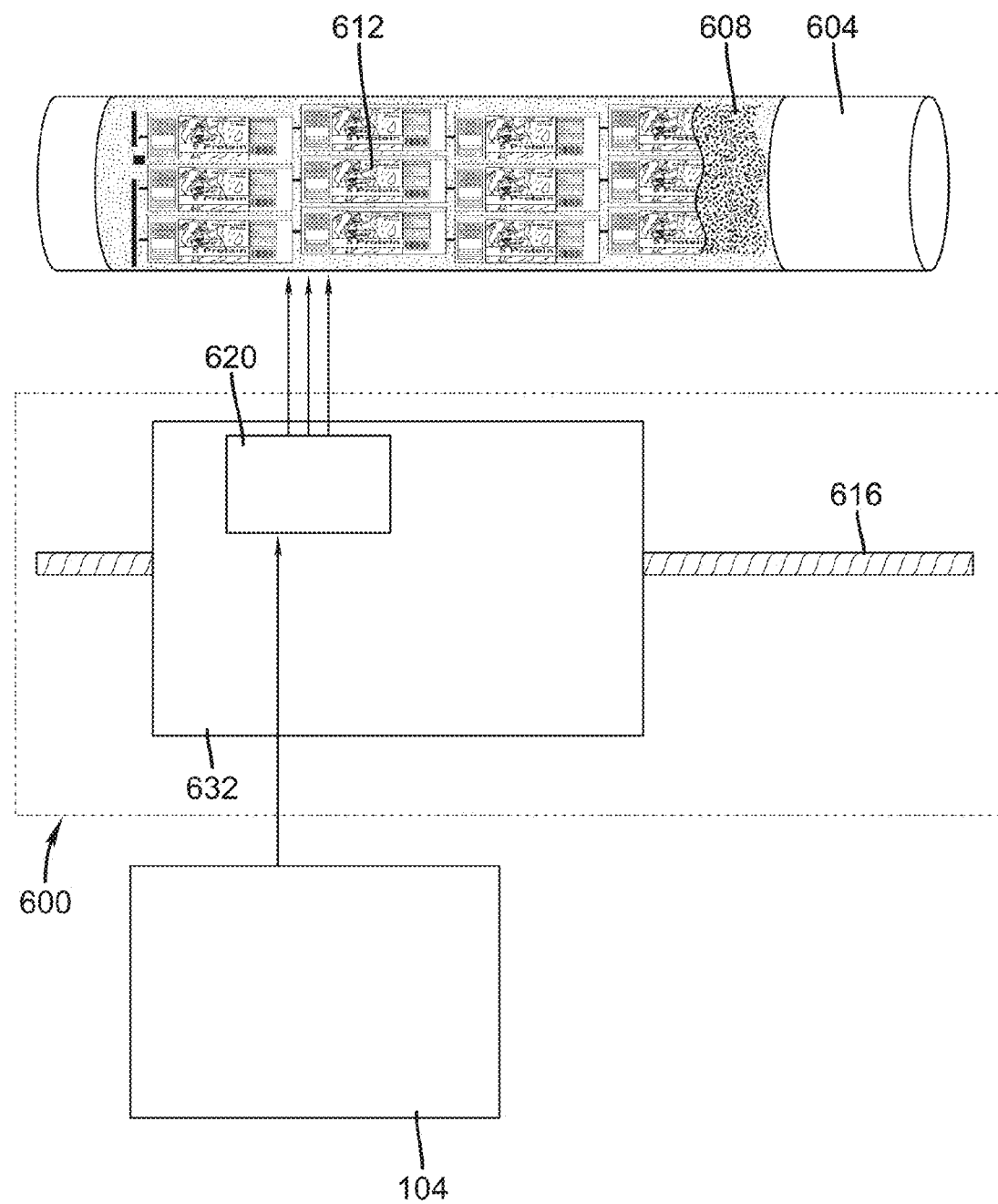
FIG. 6 is an illustration showing an imaging head writing an image on a flexographic plate.

The reconstructed step and repeat information along with the step and repeat element 208 (which is found is step 524 as well) may be used in step 528 to build a new halftone image suitable to be imaged on a required plate. FIG. 6 shows an imaging system 600 installed imaging device 108. The imaging system consists of a carriage 632. The carriage 632 is adapted to move substantially in parallel to cylinder 604 guided by an advancement screw 616. The flexographic plate 608 is imaged by imaging head 620 to form an imaged data on flexographic plate 612 on flexographic plate 608. The imaged data 612 is created by DFE 104 according to the reconstructed step and repeat information in step 524 and the size of the flexographic plate 608, to be further imaged by imaging device 108.

The invention has been described in detail with particular reference to certain preferred embodiments thereof, but it will be understood that variations and modifications can be effected within the scope of the invention.

PARTS LIST 104 digital front end (DFE)
108 imaging device
112 interface line
116 storage
200 printing job
204 screened data
208 step and repeat element
304 unique pixel area
308 step length in X direction (first axis)
312 length of stagger
316 step length in Y direction (second axis)
404 top left of step and repeat element
408 top right of step and repeat element
412 bottom left of step and repeat element
416 bottom right of step and repeat element
420 gap size
504 build step and repeat information
508 get halftone image
512 de-screen the halftone image
516 find all instances of unique pixel segments
520 reconstruct step and repeat information using unique pixel segments
524 use step and repeat information
528 use step and repeat information
600 imaging system
604 cylinder
608 flexographic plate
612 imaged data on flexographic plate
616 screw
620 imaging head
632 carriage

The invention claimed is:

1. A method for recreating step and repeat geometrical data for a new flexographic printing job from a previously rendered flexography printing job comprising:

retrieving halftone image data for the previously rendered flexography printing job from a computer storage element wherein said halftone image data contains step and repeat elements;

descreening said halftone image data on a computer to create a descreened image;

analyzing said descreened image to identify unique pixel segments in each step and repeat element;

finding all instances of said unique pixel segments on said descreened image;

calculating a distance between two consecutive step and repeat elements in an x and y direction;

calculating a length of stagger between the two consecutive step and repeat elements;

identifying a boundary box for a step and repeat element;

marking geometrical information of said instances; and recreating said step and repeat geometrical data according to said geometrical information.

2. The method according to claim 1 wherein said step and repeat data contains step and repeat geometry used to create said halftone image.

3. The method according to claim 1 wherein said step and repeat data contains gap information between the step and repeat elements in both axis directions.

4. The method according to claim 1 wherein said step and repeat data contains stagger information between the step and repeat elements in both axis directions.

5. The method according to claim 1 comprising:

imaging said step and repeat data on a flexographic printing plate.

6. The method according to claim 1 comprising:

editing said step and repeat data; and and imagining said step and repeat data on a plate.

* * * * *